United States Patent [19]
Kusiak

[11] 3,964,839
[45] June 22, 1976

[54] PITCH CHANGE MECHANISM

[75] Inventor: Edward H. Kusiak, Longmeadow, Mass.

[73] Assignee: United Technologies Corporation, Hartford, Conn.

[22] Filed: Oct. 21, 1974

[21] Appl. No.: 516,710

[52] U.S. Cl. .................. 416/160; 416/155
[51] Int. Cl.² .................. B64C 11/32
[58] Field of Search .................. 416/155–157, 416/157 A, 160

[56] References Cited

UNITED STATES PATENTS

| | | | |
|---|---|---|---|
| 3,794,442 | 2/1974 | McMurtry | 416/157 X |
| 3,801,219 | 4/1974 | Parsons et al. | 416/157 |
| 3,802,799 | 4/1974 | McMurtry | 416/157 |
| 3,825,370 | 7/1974 | McMurtry et al. | 416/160 |
| 3,866,415 | 2/1975 | Ciokajlo | 416/157 X |

*Primary Examiner*—Everette A. Powell, Jr.
*Attorney, Agent, or Firm*—John D. Del Ponti

[57] ABSTRACT

The torque to the blades for pitch change movement of a variable pitch fan of the type having a harmonic pitch change actuator is increased by coupling both the outputs of the rigid spline and flexispline to drive the blade for pitch change movement.

4 Claims, 2 Drawing Figures

PITCH CHANGE MECHANISM

BACKGROUND OF THE INVENTION

This invention relates to pitch change mechanism for a propulsor and particularly to an improved pitch change actuator of the harmonic drive type.

U.S. patent application Ser. No. 334,334 filed on Feb. 21, 1973 by Merritt Andrews, now U.S. Pat. No. 3,893,789 and assigned to the same assignee discloses and describes a harmonic pitch change actuator and is incorporated herein by reference. As disclosed therein, it is customary to utilize the rigid spline and through a bevel gear arrangement rotate the blade about its longitudinal axis. It is also customary to ground the flexispline to a ground or the barrel.

I have found that I can double the torque of the pitch change actuation by coupling the flexispline to the root of the blade and utilize its force as a part of the harmonic drive actuator. This will result in obtaining the same output of a harmonic drive that is substantially half the size as the heretofore actuator.

SUMMARY OF THE INVENTION

An object of this invention is to provide an improved pitch change actuator.

A still further object of this invention is to utilize the grounded memberspline of a harmonic drive of a variable pitch fan as a pitch change drive mechanism.

A still further object of this invention is to increase the torque of the harmonic drive by providing a coupled moment to the blade to vary its blade angle.

Other features and advantages will be apparent from the specification and claims and from the accompanying drawings which illustrate an embodiment of the invention.

BRIEF DESCRIPTION OF THE DRAWINGS

FIG. 1 is a view partly in elevation and partly in section schematically illustrating a ducted fan propulsor.

DESCRIPTION OF THE PREFERRED EMBODIMENT

Figure 2:
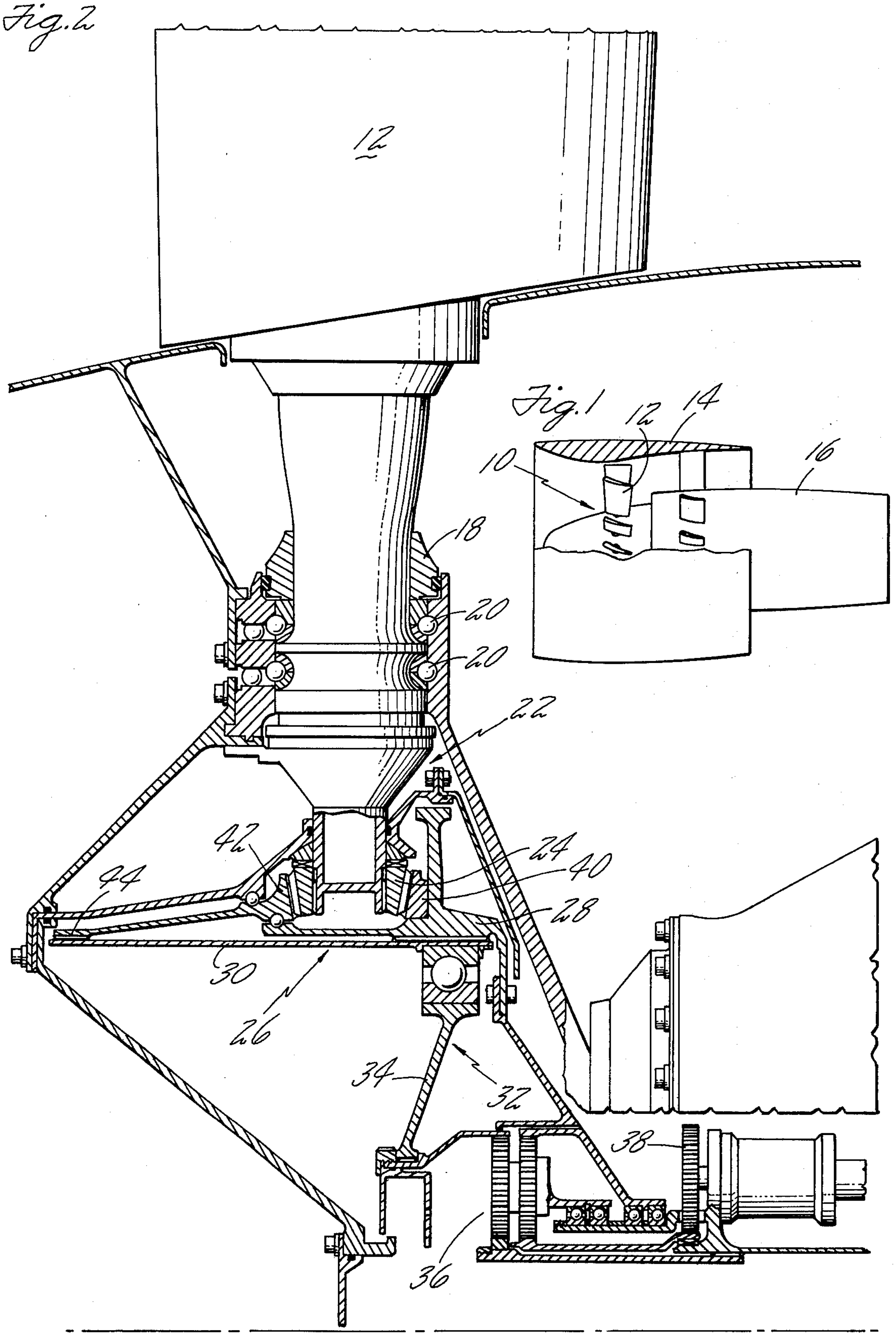
FIG. 2 is a partial view partly in section and partly in elevation illustrating the details of this invention.

This invention is particularly adapted for the pitch change actuator of the harmonic drive type that is utilized for the variable pitch ducted fan propulsor. As can be seen in FIG. 1 the ducted fan propulsor of the Q-Fan$^{TM}$ propulsor type being developed by the Hamilton Standard Division of United Aircraft Corporation comprises a variable pitch fan 10 having a plurality of blades 12 rotary supported in bypass duct 14 supported to the engine casing 16 which engine drives the fan.

The invention can best be understood by referring to FIG. 2 which shows one of the blades 12 supported to hub 18 in the conventional manner by ball bearings 20 for pitch change movement. A conventional spline 22 connected to the root of blade 12, extends within the hub and carries a suitable bevel gear 24 mating with a complementary gear of the pitch change actuator. The pitch change actuator is a harmonic drive generally indicated by reference numeral 26 comprising a rigid spline 28, flexispline 30 and wave generator generally indicated by numeral 32. The inner race 34 of the wave generator 32 is driven by the output of the differential 36 which in turn transduces the pitch change signal from the stationary portion of the propulsor to the rotating portion housing the harmonic drive.

What has been described above is deemed old in the art and is described in greater detail in U.S. Pat. No. 3,893,789, supra. Suffice it to say that a change in pitch is efffectuated by rotating gear 38 which in turn, through differential 36 rotates the inner race 34 for causing the wave generator 32 of the harmonic drive to amplify the force thereof through the action of the rigid and flexispline 28 and 32, respectively.

In accordance with this invention the segmented bevel gear 40 suitably attached to rigid spline 28 to move therewith mates with several of the teeth of bevel gear 24 and segmented bevel gear 42 mates with several teeth on the opposite side of the bevel gear 24. The bevel gear 42 is suitably splined to flexispline 30 via spline 44. Since the bevel gear 42, due to the spline 44, moves with the flexispline 30 while the rigid spline 28 moves in a direction opposite to the flexispline 30, the gears 42 and 40 impart a coupled moment to the blade.

OPERATION

Assuming a change of pitch is desired the gear 38 is caused to rotate in either a clockwise or counterclockwise direction depending on whether more or less blade angle is called for. This signal, in turn, is transmitted through the differential to cause the inner race 34 to rotate relative to the rotational speed of the hub, causing wave generator 32 to cause relative movement between the flexispline 30 and rigid spline 28. In one pitch change direction flexispline 30 rotates clockwise and rigid spline 28 rotates counterclockwise. Since gear 42 is splined to flexispline 30 and gear 40 is secured to or integral with rigid spline 28, these gears impart a coupled moment to the blade.

It is apparent from the foregoing that the input speed of the harmonic drive substantially doubles by this arrangement in comparison to the heretofore known arrangements. This results in doubling the torque input to the blades which can be translated into terms of reduced size of all of the pitch change actuator elements including the harmonic drive that would heretofore be necessary.

It should be understood that the invention is not limited to the particular embodiments shown and described herein, but that various changes and modifications may be made without departing from the spirit or scope of this novel concept as defined by the following claims.

I claim:

1. In a pitch change actuator for varying the blade angle of a blade of a rotor wherein the pitch change actuator is adapted for mounting in said rotor and has a harmonic drive unit including a rigid spline rotatable in one direction and a flexispline rotatable in an opposite direction, the improvement which comprises first means for interconnecting said rigid spline and said blade for travel in said one direction and second means for interconnecting said flexispline and said blade for travel in said opposite direction, said first and second means simultaneously imparting by said rigid spline and said flexispline a coupled moment to said blade for pitch change movement thereof.

2. The invention of claim 1 wherein a bevel gear is mounted on the root of said blade, said first means includes a first complementary bevel gear engaging on one diameter of said bevel gear connected to said rigid spline and driven thereby and said second means includes a second complementary bevel gear engaging on the opposite diameter of said bevel gear connected to said flexispline and driven thereby.

3. In a ducted fan propulsor having a rotor supporting a plurality of variable pitch fan blades and an harmonic drive means in said rotor for imparting pitch change movement to said blades, said harmonic drive means having a rigid spline rotatable in one direction and flexispline rotatable in an opposite direction, the improvement which comprises first means interconnecting said rigid spline and the root of each of said blades driven by said rigid spline in said one direction and second means interconnecting said flexispline and the root of each of said blades driven by said flexispline in said opposite direction, said first and second means imparting a coupled moment to said blades for changing the blade angle thereof whereby substantially all of the torque developed by said harmonic drive means is imparted to the blades.

4. The invention of claim 3 wherein a bevel gear is mounted on the root of said blades and is moveable therewith, said first means includes a complementary bevel gear meshing with said bevel gear and connected to said rigid spline and said second means includes a complementary bevel gear meshing with said bevel gear and a spline engaging said flexispline.

* * * * *